(12) United States Patent
    Klappert et al.

(10) Patent No.: US 9,398,345 B2
(45) Date of Patent: Jul. 19, 2016

(54) METHODS AND SYSTEMS FOR GENERATING CUSTOMIZED COLLAGES OF MEDIA ASSETS BASED ON USER CRITERIA

(71) Applicant: United Video Properties, Inc., Santa Clara, CA (US)

(72) Inventors: Walter R. Klappert, Los Angeles, CA (US); Shyam S. Vijay, Fremont, CA (US)

(73) Assignee: Rovi Guides, Inc., San Carlos, CA (US)

( * ) Notice: Subject to any disclaimer, the term of this patent is extended or adjusted under 35 U.S.C. 154(b) by 192 days.

(21) Appl. No.: 14/191,696

(22) Filed: Feb. 27, 2014

(65) Prior Publication Data

US 2015/0245107 A1    Aug. 27, 2015

(51) Int. Cl.
    *H04N 21/482*     (2011.01)
    *H04N 21/485*     (2011.01)
    *G06F 17/30*      (2006.01)
    *H04N 21/431*     (2011.01)
    *H04N 21/45*      (2011.01)
    *H04N 21/475*     (2011.01)

(52) U.S. Cl.
    CPC ........ *H04N 21/4858* (2013.01); *G06F 17/3005* (2013.01); *H04N 21/4312* (2013.01); *H04N 21/4532* (2013.01); *H04N 21/4755* (2013.01); *H04N 21/482* (2013.01)

(58) Field of Classification Search
    USPC ................................. 725/45, 46, 47
    See application file for complete search history.

(56) References Cited

U.S. PATENT DOCUMENTS

| | | | |
|---|---|---|---|
| 6,239,794 B1 | 5/2001 | Yuen et al. | |
| 6,388,714 B1 | 5/2002 | Schein et al. | |
| 6,564,378 B1 | 5/2003 | Satterfield et al. | |
| 6,756,997 B1 | 6/2004 | Ward, III et al. | |
| 7,165,098 B1 | 1/2007 | Boyer et al. | |
| 7,761,892 B2 | 7/2010 | Ellis et al. | |
| 8,046,801 B2 | 10/2011 | Ellis et al. | |
| 2002/0174430 A1 | 11/2002 | Ellis et al. | |
| 2003/0110499 A1 | 6/2003 | Knudson et al. | |
| 2005/0251827 A1 | 11/2005 | Ellis et al. | |
| 2010/0153885 A1 | 6/2010 | Yates | |
| 2014/0081992 A1* | 3/2014 | Peterson | G06F 17/30386 707/749 |

* cited by examiner

*Primary Examiner* — Kieu Oanh T Bui
(74) *Attorney, Agent, or Firm* — Ropes & Gray LLP

(57) ABSTRACT

Methods and systems are described herein for the generation of customized collages of media assets that allow a user to quickly and efficiently review numerous media assets related to user selected criteria. For example, in response to a user requesting a search of "Johnny Appleseed," a media guidance application may retrieve a plurality of media assets from various sources (e.g., television shows, newspaper articles, radio broadcasts, Internet websites, etc.) related to Johnny Appleseed and display the plurality of media assets simultaneously.

20 Claims, 6 Drawing Sheets

METHODS AND SYSTEMS FOR GENERATING CUSTOMIZED COLLAGES OF MEDIA ASSETS BASED ON USER CRITERIA

BACKGROUND

Given the plethora of media content available to users today, users may have trouble determining what media content to view even if they know the subject matter with which they wish to watch. For example, a typical search, whether via an Internet search engine or a television guide, often yields numerous viewing options. Unfortunately, perusing each available option, both to understand the content and to determine whether or not to view the available option in full, is extremely time intensive

SUMMARY

Accordingly, methods and systems are described herein for the generation of customized collages of media assets that allow a user to quickly and efficiently review numerous media assets related to user selected criteria. For example, in response to a user requesting a search of "Johnny Appleseed," a media guidance application may retrieve a plurality of media assets from various sources (e.g., television shows, newspaper articles, radio broadcasts, Internet websites, etc.) related to Johnny Appleseed and display the plurality of media assets simultaneously. The media guidance application may also position, size, and/or otherwise modify the media asset such that the media assets are presented in an organized manner that allows a user to quickly and efficiently review the media assets individually or gain an overall impression of the plurality of media assets as a whole.

In some aspects, the media guidance application determines a plurality of media assets corresponding to a user criterion. For example, in response to a user input requesting a presentation of media assets associated with endangered elephants, the media guidance application may search a plurality of cable, satellite, Internet, radio, and print sources for media assets associated with endangered elephants. The media guidance application then categorizes the plurality of media assets into groups with similar characteristics. For example, if the media guidance application receives a media asset with the same content (e.g., an associated press article published by various news outlets), the media guidance application categorizes all of these media assets together. In another example, if the media guidance application determines that several media assets originate from the same source (e.g., a report on elephants that was published as a television broadcast, internet article, and radio announcement), the media guidance application may categorize these media assets together as well.

The media guidance application may then select a media asset from each of the groups. For example, when generating or displaying a collage of media assets for simultaneous consumption by a user, the media guidance application may only show a single media asset associated with a group of media assets. For example, the media guidance application may select a media asset that is representative of the content, information, and/or point of view related to the user criterion associated with the group.

The media guidance application may then determine an accentuation for each selected media asset based on a quality associated with a group from which the selected media asset was selected. For example, the media guidance application may determine a position, size, highlight, etc. for the selected media asset in the collage of media assets based on the popularity of the media assets in the group, the number of media assets in the group, the popularity of sources in the group, etc. The media guidance application then generates for simultaneous consumption by a user the selected media assets on a display device with the determined accentuation. For example, the media guidance application may generate a collage of media assets, in which each media asset has the determined accentuation.

In some embodiments, the media guidance application receives the user criterion via user input interface circuitry, and cross-reference the user criterion with a database of available media to determine the plurality of media assets corresponding to the user criterion. For example, in response to a user request to search for media assets associated with "Miley Cyrus," the media guidance application may conduct one or more searches via one or more search engines to retrieve available media assets associated with Miley Cyrus.

In some embodiments, the media guidance application may categorize retrieved media assets based on media assets having similar characteristics associated with the media assets (e.g., as indicated by data associated with the media assets). For example, similar characteristics may include similar content, similar content types, or similar content sources, and wherein the quality associated with the group from which the selected media asset was selected includes a number of media assets in each group, a popularity of media assets in each group, or a popularity of sources of media assets in each group.

In some embodiments, the media guidance application may cross-reference the quality associated with the group from which the selected media asset was selected with a database mapping qualities to accentuations to determine the accentuation for each selected media asset. For example, based on the number of media assets in the group, the media guidance application may determine a size, position, video quality, or audio quality for the media asset selected to represent the group.

In some embodiments, the media guidance application determines the accentuation for each selected media asset based on the quality associated with the group from which the selected media asset was selected by ranking the various groups of media assets. For example, the media guidance application may determine a first quality associated with a first group and determine a second quality associated with a second group. The media guidance application may then determine a first rank for the first group and a second rank for the second group based on the first quality and the second quality, in which the first rank is higher than the second rank. The media guidance application may then select a first accentuation that corresponds to the first rank and a second accentuation that corresponds to the second rank, in which the first accentuation is greater than the second accentuation.

In some embodiments, the media guidance application may adjust the accentuation after generating the media assets for simultaneous consumption. For example, the media guidance application may receive a user selection of one of the selected media assets while generated for simultaneous consumption and in response to the user selection, determine a new accentuation (e.g., increase the size of the display of the media asset) for the one of the selected media assets.

In some embodiments, the media guidance application may generate a plurality of media assets in a collage featuring a mosaic display of media assets. Additionally or alternatively, the display may include media assets in which one of the selected media assets is a video presentation, one of the selected media assets is an audio presentation, and one of the selected media assets is a text-based presentation. The media guidance application may also crop one or more of the media assets in order to generate a collage with a predetermined runtime. For example, the collage of media assets may run for five minutes and then repeat.

It should be noted, the systems and/or methods described above may be applied to, or used in accordance with, other systems, methods and/or apparatuses.

BRIEF DESCRIPTION OF THE DRAWINGS

The above and other objects and advantages of the disclosure will be apparent upon consideration of the following detailed description, taken in conjunction with the accompanying drawings, in which like reference characters refer to like parts throughout, and in which.

DETAILED DESCRIPTION OF DRAWINGS

Figure 1:
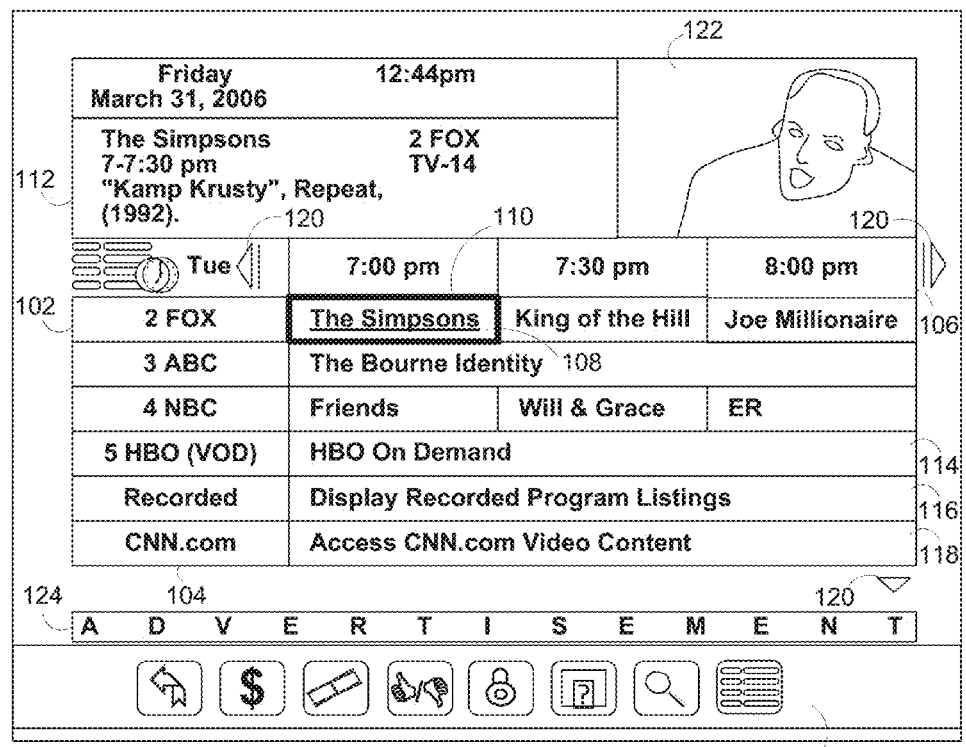
FIG. 1 shows an illustrative example of a media guidance application in accordance with some embodiments of the disclosure.

Methods and systems are described herein for a media guidance application that generates customized collages of media assets that allow a user to quickly and efficiently review numerous media assets related to user selected criteria. For example, in response to a user requesting a search of "Popular Songs," a media guidance application may retrieve a plurality of media assets from various sources (e.g., television shows, newspaper articles, radio broadcasts, Internet websites, etc.) related to currently popularity songs and display the plurality of media assets simultaneously. The media guidance application may also position, size, and/or otherwise modify the media asset such that the media assets are presented in an organized manner that allows a user to quickly and efficiently review the media assets individually or gain an overall impression of the plurality of media assets as a whole.

As referred to herein, a "media guidance application," or an "interactive media guidance application" or, sometimes, a "media guidance application" or a "guidance application" is an application that allows a user to consume, and/or navigate to, media assets. In some embodiments, the media guidance application may be provided as an on-line application (i.e., provided on a website), or as a stand-alone application on a server, user device, etc. Various devices and platforms that may implement the media guidance application are described in more detail below. In some embodiments, the media guidance application and/or any instructions for performing any of the embodiments discussed herein may be encoded on computer readable media. Computer readable media includes any media capable of storing data. The computer readable media may be transitory, including, but not limited to, propagating electrical or electromagnetic signals, or may be non-transitory including, but not limited to, volatile and nonvolatile computer memory or storage devices such as a hard disk, floppy disk, USB drive, DVD, CD, media card, register memory, processor caches, Random Access Memory ("RAM"), etc.

Interactive media guidance applications may take various forms depending on the content for which they provide guidance. One typical type of media guidance application is an interactive television program guide. Interactive television program guides (sometimes referred to as electronic program guides) are well-known guidance applications that, among other things, allow users to navigate among and locate many types of content or media assets. Interactive media guidance applications may generate graphical user interface screens that enable a user to navigate among, locate and select content.

As referred to herein, the terms "media asset" and "content" should be understood to mean an electronically consumable user asset, such as television programming, as well as pay-per-view programs, on-demand programs (as in video-on-demand (VOD) systems), Internet content (e.g., streaming content, downloadable content, Webcasts, etc.), video clips, audio, content information, pictures, rotating images, documents, playlists, websites, articles, books, electronic books, blogs, advertisements, chat sessions, social media, applications, games, and/or any other media or multimedia and/or combination of the same. Guidance applications also allow users to navigate among and locate content. As referred to herein, the term "multimedia" should be understood to mean content that utilizes at least two different content forms described above, for example, text, audio, images, video, or interactivity content forms. Content may be recorded, played, displayed or accessed by user equipment devices, but can also be part of a live performance.

In some embodiments, the media guidance application determines a plurality of media assets corresponding to a user criterion. For example, in response to a user input requesting a presentation of media assets associated with "Current Event," the media guidance application may search one or more sources for media assets associated with current events. The media guidance application then categorizes the plurality of media assets into groups with similar characteristics.

As referred to herein, a "source" refers to an entity, location, or device that is a content provider, content distributor, content creator and/or otherwise facilitates the communication of media assets to a user and/or user device. For example, a source may be any cable, satellite, Internet, radio, or print content provider and/or content distributor. For example, a source may include news agency that issues a report. A source may include an Internet company that provides streaming media via the Internet. A source may be a person that posts information to a social media web-site or on-line blog. In addition, a source may refer to a particular search engine and/or database that stores a media asset.

As used herein, a "characteristic" is any quality that distinguishes or otherwise describes a media asset and/or any information associated with the media asset. For example, if the media guidance application receives a media asset (e.g., an associated press article published by various news outlets) with the same content (e.g., a characteristic of the media asset), the media guidance application may categorize the media asset in a group associated with similar content. In another example, if the media guidance application determines that several media assets (e.g., a report on elephants that was published as a television broadcast, internet article, and radio announcement) originate from the same source (e.g., another characteristic), the media guidance application may categorize these media assets into the same group as well.

The media guidance application may then select a media asset from each of the groups. For example, when generating or displaying a collage of media assets for simultaneous consumption by a user, the media guidance application may only show a single media asset associated with a group of media assets. For example, the media guidance application may select a media asset that is representative of the content, information, and/or point of view related to the user criterion associated with the group.

The media guidance application may also determine an accentuation for each selected media asset based on a quality associated with a group from which the selected media asset was selected. As used herein, an "accentuation" refers to any distinction, including, but not limited to difference related to a size, format, position, visual quality, and/or audio quality, between media assets in a collage. The media guidance application may determine an accentuation based on a quality of a group from which a media asset is selected. As used herein, a "quality of a group" refers to any quantifiable difference between groups. For example, the media guidance application may determine a position, size, highlight, etc. for the selected media asset in the collage of media assets based on the popularity of the media assets in the group, the number of media assets in the group, the popularity of sources in the group, etc. The media guidance application then generates for simultaneous consumption by a user the selected media assets on a display device with the determined accentuation. For example, the media guidance application may generate a collage of media assets, in which each media asset has the determined accentuation.

In some embodiments, the media guidance application may additionally or alternatively present one or more media assets in series. For example, the media guidance application may present a first media asset and then present a second media asset after the first media asset has ended. It should be noted that any embodiment discussed herein that presents media assets for simultaneous consumption to a user (e.g., in a collage) may additionally or alternatively be used to present media assets in series (e.g., one after another) for consumption to a user (e.g., in a montage).

Additionally or alternatively, one or more media assets may be cropped to conform to a particular play length. For example, despite various media assets have a different play length, the media guidance application may crop each media asset to a particular play length (e.g., five minutes) or a play length based on the characteristics or qualities associated with the media asset or the group from which it was selected.

Additionally or alternatively, only a portion of the various media assets (e.g., an audio component) may be played in series. For example, the media guidance application may present multiple video components of media assets, but only play an audio component associated with one of the media assets. The media guidance application may cycle through the various media assets playing the audio component (or a portion of the audio component) associated with each of the media assets one at a time and in series.

In some embodiments, the media guidance application receives the user criterion via user input interface circuitry, and cross-reference the user criterion with a database of available media to determine the plurality of media assets corresponding to the user criterion. For example, in response to a user request to search for media assets associated with "Mickey Mouse," the media guidance application may conduct one or more searches via one or more search engines to retrieve available media assets associated with Mickey Mouse.

In some embodiments, the media guidance application may categorize retrieved media assets based on media assets having similar characteristics associated with the media assets (e.g., as indicated by data associated with the media assets). For example, similar characteristics may include similar content, similar content types, or similar content sources, and wherein the quality associated with the group from which the selected media asset was selected includes a number of media assets in each group, a popularity of media assets in each group, or a popularity of sources of media assets in each group.

In some embodiments, the media guidance application may cross-reference the quality associated with the group from which the selected media asset was selected with a database mapping qualities to accentuations to determine the accentuation for each selected media asset. For example, based on the number of media assets in the group, the media guidance application may determine a size, position, video quality, or audio quality for the media asset selected to represent the group.

In some embodiments, the media guidance application determines the accentuation for each selected media asset based on the quality associated with the group from which the selected media asset was selected by ranking the various groups of media assets. For example, the media guidance application may determine a first quality associated with a first group and determine a second quality associated with a second group. The media guidance application may then determine a first rank for the first group and a second rank for the second group based on the first quality and the second quality, in which the first rank is higher than the second rank. The media guidance application may then select a first accentuation that corresponds to the first rank and a second accentuation that corresponds to the second rank, in which the first accentuation is greater than the second accentuation.

In some embodiments, the media guidance application may adjust the accentuation after generating the media assets for simultaneous consumption. For example, the media guidance application may receive a user selection of one of the selected media assets while generated for simultaneous consumption and in response to the user selection, determining a new accentuation (e.g., increase the size of the display of the media asset) for the one of the selected media assets.

For example, the media guidance application may generate for display a plurality of media assets for simultaneous consumption in a collage. Each of the media assets may be presented without audio content (or only one media asset may be presented with audio content). In response to a particular media asset being selected by a user, the media guidance application may generate the audio output for the selected media asset. In another example, each of the media assets may be presented in the same size. In response to a particular media asset being selected by a user, the media guidance application may generate the media asset in a larger size relative to the other media assets.

In some embodiments, the media guidance application may generate a plurality of media assets in a collage featuring a mosaic display of media assets. Additionally or alternatively, the display may include media assets in which one of the selected media assets is a video presentation, one of the selected media assets is an audio presentation, and one of the selected media assets is a text-based presentation. The media guidance application may also crop one or more of the media assets in order to generate a collage with a predetermined runtime. For example, the collage of media assets may run for five minutes and then repeat.

With the advent of the Internet, mobile computing, and high-speed wireless networks, users are accessing media on user equipment devices on which they traditionally did not. As referred to herein, the phrase "user equipment device," "user equipment," "user device," "electronic device," "electronic equipment," "media equipment device," or "media device" should be understood to mean any device for accessing the content described above, such as a television, a Smart TV, a set-top box, an integrated receiver decoder (IRD) for handling satellite television, a digital storage device, a digital media receiver (DMR), a digital media adapter (DMA), a streaming media device, a DVD player, a DVD recorder, a connected DVD, a local media server, a BLU-RAY player, a BLU-RAY recorder, a personal computer (PC), a laptop computer, a tablet computer, a WebTV box, a personal computer television (PC/TV), a PC media server, a PC media center, a hand-held computer, a stationary telephone, a personal digital assistant (PDA), a mobile telephone, a portable video player, a portable music player, a portable gaming machine, a smart phone, or any other television equipment, computing equipment, or wireless device, and/or combination of the same. In some embodiments, the user equipment device may have a front facing screen and a rear facing screen, multiple front screens, or multiple angled screens.

In some embodiments, the user equipment device may have a front facing camera and/or a rear facing camera. On these user equipment devices, users may be able to navigate among and locate the same content available through a television. Consequently, media guidance may be available on these devices, as well. The guidance provided may be for content available only through a television, for content available only through one or more of other types of user equipment devices, or for content available both through a television and one or more of the other types of user equipment devices. The media guidance applications may be provided as on-line applications (i.e., provided on a web-site), or as stand-alone applications or clients on user equipment devices. Various devices and platforms that may implement media guidance applications are described in more detail below.

One of the functions of the media guidance application is to provide media guidance data to users. As referred to herein, the phrase, "media guidance data" or "guidance data" should be understood to mean any data related to content, such as media listings, media-related information (e.g., broadcast times, broadcast channels, titles, descriptions, ratings information (e.g., parental control ratings, critic's ratings, etc.), genre or category information, actor information, logo data for broadcasters' or providers' logos, etc.), media format (e.g., standard definition, high definition, 3D, etc.), advertisement information (e.g., text, images, media clips, etc.), on-demand information, blogs, websites, and any other type of guidance data that is helpful for a user to navigate among and locate desired content selections.

Figure 2:
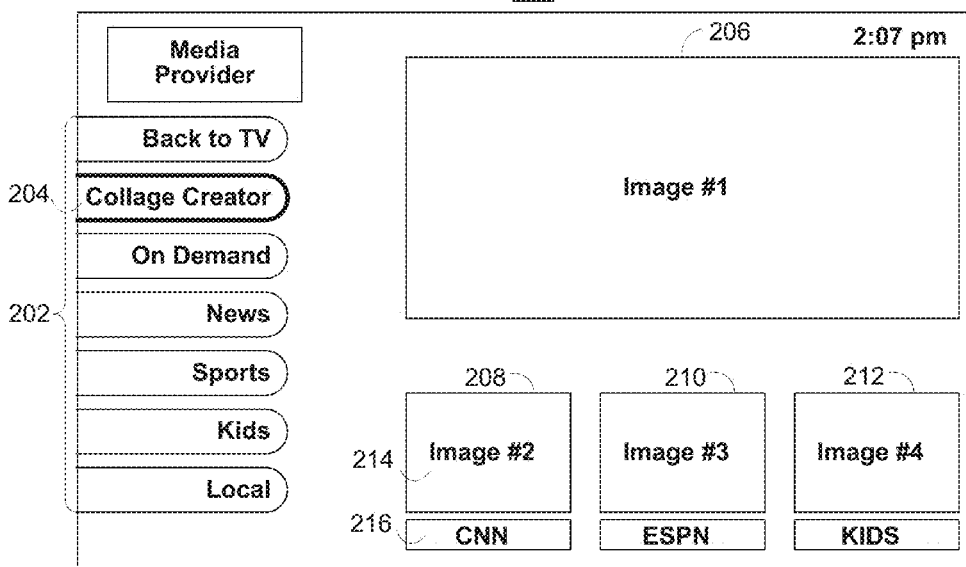
FIG. 2 shows another illustrative example of a media guidance application in accordance with some embodiments of the disclosure.

FIGS. 1-2 show illustrative display screens that may be used to provide media guidance data. The display screens shown in FIGS. 1, 2, and 5A-B may be implemented on any suitable user equipment device or platform. While the displays of FIGS. 1, 2, and 5A-B are illustrated as full screen displays, they may also be fully or partially overlaid over content being displayed. A user may indicate a desire to access content information by selecting a selectable option provided in a display screen (e.g., a menu option, a listings option, an icon, a hyperlink, etc.) or pressing a dedicated button (e.g., a GUIDE button) on a remote control or other user input interface or device. In response to the user's indication, the media guidance application may provide a display screen with media guidance data organized in one of several ways, such as by time and channel in a grid, by time, by channel, by source, by content type, by category (e.g., movies, sports, news, children, or other categories of programming), or other predefined, user-defined, or other organization criteria. The organization of the media guidance data is determined by guidance application data. As referred to herein, the phrase, "guidance application data" should be understood to mean data used in operating the guidance application, such as program information, guidance application settings, user preferences, or user profile information.

FIG. 1 shows illustrative grid program listings display 100 arranged by time and channel that also enables access to different types of content in a single display. Display 100 may include grid 102 with: (1) a column of channel/content type identifiers 104, where each channel/content type identifier (which is a cell in the column) identifies a different channel or content type available; and (2) a row of time identifiers 106, where each time identifier (which is a cell in the row) identifies a time block of programming. Grid 102 also includes cells of program listings, such as program listing 108, where each listing provides the title of the program provided on the listing's associated channel and time. With a user input device, a user can select program listings by moving highlight region 110. Information relating to the program listing selected by highlight region 110 may be provided in program information region 112. Region 112 may include, for example, the program title, the program description, the time the program is provided (if applicable), the channel the program is on (if applicable), the program's rating, and other desired information.

In addition to providing access to linear programming (e.g., content that is scheduled to be transmitted to a plurality of user equipment devices at a predetermined time and is provided according to a schedule), the media guidance application also provides access to non-linear programming (e.g., content accessible to a user equipment device at any time and is not provided according to a schedule). Non-linear programming may include content from different content sources including on-demand content (e.g., VOD), Internet content (e.g., streaming media, downloadable media, etc.), locally stored content (e.g., content stored on any user equipment device described above or other storage device), or other time-independent content. On-demand content may include movies or any other content provided by a particular content provider (e.g., HBO On Demand providing "The Sopranos" and "Curb Your Enthusiasm"). HBO ON DEMAND is a service mark owned by Time Warner Company L.P. et al. and THE SOPRANOS and CURB YOUR ENTHUSIASM are trademarks owned by the Home Box Office, Inc. Internet content may include web events, such as a chat session or Webcast, or content available on-demand as streaming content or downloadable content through an Internet web site or other Internet access (e.g. FTP).

Grid 102 may provide media guidance data for non-linear programming including on-demand listing 114, recorded content listing 116, and Internet content listing 118. A display combining media guidance data for content from different types of content sources is sometimes referred to as a "mixed-media" display. Various permutations of the types of media guidance data that may be displayed that are different than display 100 may be based on user selection or guidance application definition (e.g., a display of only recorded and broadcast listings, only on-demand and broadcast listings, etc.). As illustrated, listings 114, 116, and 118 are shown as spanning the entire time block displayed in grid 102 to indicate that selection of these listings may provide access to a display dedicated to on-demand listings, recorded listings, or Internet listings, respectively. In some embodiments, listings for these content types may be included directly in grid 102. Additional media guidance data may be displayed in response to the user selecting one of the navigational icons 120. (Pressing an arrow key on a user input device may affect the display in a similar manner as selecting navigational icons 120.)

Display 100 may also include video region 122, advertisement 124, and options region 126. Video region 122 may allow the user to view and/or preview programs that are currently available, will be available, or were available to the user. The content of video region 122 may correspond to, or be independent from, one of the listings displayed in grid 102. Grid displays including a video region are sometimes referred to as picture-in-guide (PIG) displays. PIG displays and their functionalities are described in greater detail in Satterfield et al. U.S. Pat. No. 6,564,378, issued May 13, 2003 and Yuen et al. U.S. Pat. No. 6,239,794, issued May 29, 2001, which are hereby incorporated by reference herein in their entireties. PIG displays may be included in other media guidance application display screens of the embodiments described herein.

Advertisement 124 may provide an advertisement for content that, depending on a viewer's access rights (e.g., for subscription programming), is currently available for viewing, will be available for viewing in the future, or may never become available for viewing, and may correspond to or be unrelated to one or more of the content listings in grid 102. Advertisement 124 may also be for products or services related or unrelated to the content displayed in grid 102. Advertisement 124 may be selectable and provide further information about content, provide information about a product or a service, enable purchasing of content, a product, or a service, provide content relating to the advertisement, etc. Advertisement 124 may be targeted based on a user's profile/preferences, monitored user activity, the type of display provided, or on other suitable targeted advertisement bases.

While advertisement 124 is shown as rectangular or banner shaped, advertisements may be provided in any suitable size, shape, and location in a guidance application display. For example, advertisement 124 may be provided as a rectangular shape that is horizontally adjacent to grid 102. This is sometimes referred to as a panel advertisement. In addition, advertisements may be overlaid over content or a guidance application display or embedded within a display. Advertisements may also include text, images, rotating images, video clips, or other types of content described above. Advertisements may be stored in a user equipment device having a guidance application, in a database connected to the user equipment, in a remote location (including streaming media servers), or on other storage means, or a combination of these locations. Providing advertisements in a media guidance application is discussed in greater detail in, for example, Knudson et al., U.S. Patent Application Publication No. 2003/0110499, filed Jan. 17, 2003; Ward, III et al. U.S. Pat. No. 6,756,997, issued Jun. 29, 2004; and Schein et al. U.S. Pat. No. 6,388,714, issued May 14, 2002, which are hereby incorporated by reference herein in their entireties. It will be appreciated that advertisements may be included in other media guidance application display screens of the embodiments described herein.

Options region 126 may allow the user to access different types of content, media guidance application displays, and/or media guidance application features. Options region 126 may be part of display 100 (and other display screens described herein), or may be invoked by a user by selecting an on-screen option or pressing a dedicated or assignable button on a user input device. The selectable options within options region 126 may concern features related to program listings in grid 102 or may include options available from a main menu display. Features related to program listings may include searching for other air times or ways of receiving a program, recording a program, enabling series recording of a program, setting program and/or channel as a favorite, purchasing a program, or other features. Options available from a main menu display may include search options, VOD options, parental control options, Internet options, cloud-based options, device synchronization options, second screen device options, options to access various types of media guidance data displays, options to subscribe to a premium service, options to edit a user's profile, options to access a browse overlay, or other options.

The media guidance application may be personalized based on a user's preferences. A personalized media guidance application allows a user to customize displays and features to create a personalized "experience" with the media guidance application. This personalized experience may be created by allowing a user to input these customizations and/or by the media guidance application monitoring user activity to determine various user preferences. Users may access their personalized guidance application by logging in or otherwise identifying themselves to the guidance application. Customization of the media guidance application may be made in accordance with a user profile. The customizations may include varying presentation schemes (e.g., color scheme of displays, font size of text, etc.), aspects of content listings displayed (e.g., only HDTV or only 3D programming, user-specified broadcast channels based on favorite channel selections, re-ordering the display of channels, recommended content, etc.), desired recording features (e.g., recording or series recordings for particular users, recording quality, etc.), parental control settings, customized presentation of Internet content (e.g., presentation of social media content, e-mail, electronically delivered articles, etc.) and other desired customizations.

The media guidance application may allow a user to provide user profile information or may automatically compile user profile information. The media guidance application may, for example, monitor the content the user accesses and/or other interactions the user may have with the guidance application. Additionally, the media guidance application may obtain all or part of other user profiles that are related to a particular user (e.g., from other web sites on the Internet the user accesses, such as www.allrovi.com, from other media guidance applications the user accesses, from other interactive applications the user accesses, from another user equipment device of the user, etc.), and/or obtain information about the user from other sources that the media guidance application may access. As a result, a user can be provided with a unified guidance application experience across the user's different user equipment devices. This type of user experience is described in greater detail below in connection with FIG. 4. Additional personalized media guidance application features are described in greater detail in Ellis et al., U.S. Patent Application Publication No. 2005/0251827, filed Jul. 11, 2005, Boyer et al., U.S. Pat. No. 7,165,098, issued Jan. 16, 2007, and Ellis et al., U.S. Patent Application Publication No. 2002/0174430, filed Feb. 21, 2002, which are hereby incorporated by reference herein in their entireties.

Another display arrangement for providing media guidance is shown in FIG. 2. Video mosaic display 200 includes selectable options 202 for content information organized based on content type, genre, and/or other organization criteria. In display 200, selectable option 204 is selected. Selectable option 204 corresponds to a collage creator option. For example, the media guidance application may generate display 500 (FIG. 5A) in response to the selection of selectable option 204. In display 200 the listings may provide graphical images including cover art, still images from the content, video clip previews, live video from the content, or other types of content that indicate to a user the content being described by the media guidance data in the listing. Each of the graphical listings may also be accompanied by text to provide further information about the content associated with the listing. For example, listings 208, 210, and 212 may include more than one portion, including media portion 214 and text portion 216. Media portion 214 and/or text portion 216 may be selectable to view content in full-screen or to view information related to the content displayed in media portion 214 (e.g., to view listings for the channel that the video is displayed on).

The listings in display 200 are of different sizes (i.e., listing 206 is larger than listings 208, 210, and 212), but if desired, all the listings may be the same size. Listings may be of different sizes or graphically accentuated to indicate degrees of interest to the user or to emphasize certain content, as desired by the content provider or based on user preferences. Various systems and methods for graphically accentuating content listings are discussed in, for example, Yates, U.S. Patent Application Publication No. 2010/0153885, filed Dec. 29, 2005, which is hereby incorporated by reference herein in its entirety.

Figure 3:
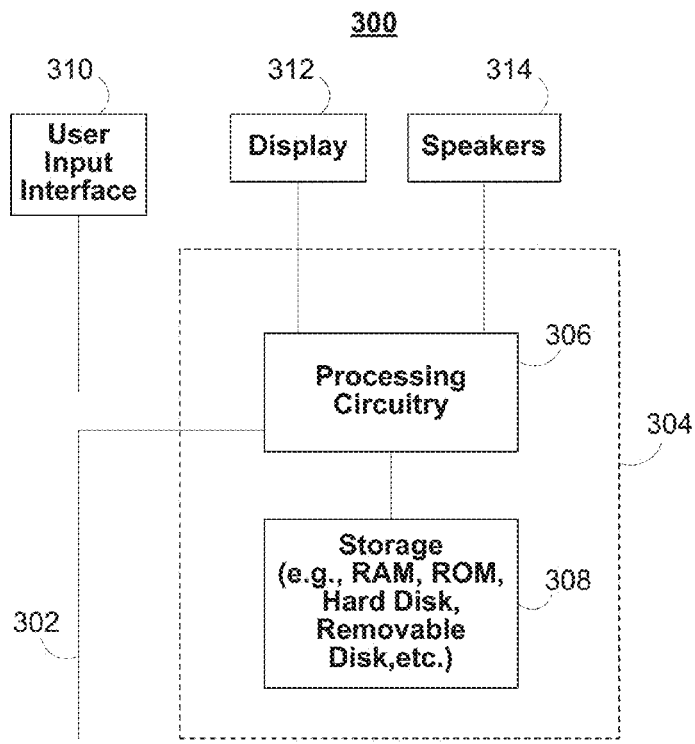
FIG. 3 is a block diagram of an illustrative user equipment device in accordance with some embodiments of the disclosure.

Users may access content and the media guidance application (and its display screens described above and below) from one or more of their user equipment devices. FIG. 3 shows a generalized embodiment of illustrative user equipment device 300. More specific implementations of user equipment devices are discussed below in connection with FIG. 4. User equipment device 300 may receive content and data via input/output (hereinafter "I/O") path 302. I/O path 302 may provide content (e.g., broadcast programming, on-demand programming, Internet content, content available over a local area network (LAN) or wide area network (WAN), and/or other content) and data to control circuitry 304, which includes processing circuitry 306 and storage 308. Control circuitry 304 may be used to send and receive commands, requests, and other suitable data using I/O path 302. I/O path 302 may connect control circuitry 304 (and specifically processing circuitry 306) to one or more communications paths (described below). I/O functions may be provided by one or more of these communications paths, but are shown as a single path in FIG. 3 to avoid overcomplicating the drawing.

Control circuitry 304 may be based on any suitable processing circuitry such as processing circuitry 306. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer. In some embodiments, processing circuitry may be distributed across multiple separate processors or processing units, for example, multiple of the same type of processing units (e.g., two Intel Core i7 processors) or multiple different processors (e.g., an Intel Core i5 processor and an Intel Core i7 processor). In some embodiments, control circuitry 304 executes instructions for a media guidance application stored in memory (i.e., storage 308). Specifically, control circuitry 304 may be instructed by the media guidance application to perform the functions discussed above and below. For example, the media guidance application may provide instructions to control circuitry 304 to generate the media guidance displays. In some implementations, any action performed by control circuitry 304 may be based on instructions received from the media guidance application.

In client-server based embodiments, control circuitry 304 may include communications circuitry suitable for communicating with a guidance application server or other networks or servers. The instructions for carrying out the above mentioned functionality may be stored on the guidance application server. Communications circuitry may include a cable modem, an integrated services digital network (ISDN) modem, a digital subscriber line (DSL) modem, a telephone modem, Ethernet card, or a wireless modem for communications with other equipment, or any other suitable communications circuitry. Such communications may involve the Internet or any other suitable communications networks or paths (which is described in more detail in connection with FIG. 4). In addition, communications circuitry may include circuitry that enables peer-to-peer communication of user equipment devices, or communication of user equipment devices in locations remote from each other (described in more detail below).

Memory may be an electronic storage device provided as storage 308 that is part of control circuitry 304. As referred to herein, the phrase "electronic storage device" or "storage device" should be understood to mean any device for storing electronic data, computer software, or firmware, such as random-access memory, read-only memory, hard drives, optical drives, digital video disc (DVD) recorders, compact disc (CD) recorders, BLU-RAY disc (BD) recorders, BLU-RAY 3D disc recorders, digital video recorders (DVR, sometimes called a personal video recorder, or PVR), solid state devices, quantum storage devices, gaming consoles, gaming media, or any other suitable fixed or removable storage devices, and/or any combination of the same. Storage 308 may be used to store various types of content described herein as well as media guidance information, described above, and guidance application data, described above. Nonvolatile memory may also be used (e.g., to launch a boot-up routine and other instructions). Cloud-based storage, described in relation to FIG. 4, may be used to supplement storage 308 or instead of storage 308.

Control circuitry 304 may include video generating circuitry and tuning circuitry, such as one or more analog tuners, one or more MPEG-2 decoders or other digital decoding circuitry, high-definition tuners, or any other suitable tuning or video circuits or combinations of such circuits. Encoding circuitry (e.g., for converting over-the-air, analog, or digital signals to MPEG signals for storage) may also be provided. Control circuitry 304 may also include scaler circuitry for upconverting and downconverting content into the preferred output format of the user equipment 300. Circuitry 304 may also include digital-to-analog converter circuitry and analog-to-digital converter circuitry for converting between digital and analog signals. The tuning and encoding circuitry may be used by the user equipment device to receive and to display, to play, or to record content. The tuning and encoding circuitry may also be used to receive guidance data. The circuitry described herein, including for example, the tuning, video generating, encoding, decoding, encrypting, decrypting, scaler, and analog/digital circuitry, may be implemented using software running on one or more general purpose or specialized processors. Multiple tuners may be provided to handle simultaneous tuning functions (e.g., watch and record functions, picture-in-picture (PIP) functions, multiple-tuner recording, etc.). If storage 308 is provided as a separate device from user equipment 300, the tuning and encoding circuitry (including multiple tuners) may be associated with storage 308.

A user may send instructions to control circuitry 304 using user input interface 310. User input interface 310 may be any suitable user interface, such as a remote control, mouse, trackball, keypad, keyboard, touch screen, touchpad, stylus input, joystick, voice recognition interface, or other user input interfaces. Display 312 may be provided as a stand-alone device or integrated with other elements of user equipment device 300. For example, display 312 may be a touchscreen or touch-sensitive display. In such circumstances, user input interface 310 may be integrated with or combined with display 312. Display 312 may be one or more of a monitor, a television, a liquid crystal display (LCD) for a mobile device, amorphous silicon display, low temperature poly silicon display, electronic ink display, electrophoretic display, active matrix display, electro-wetting display, electrofluidic display, cathode ray tube display, light-emitting diode display, electroluminescent display, plasma display panel, high-performance addressing display, thin-film transistor display, organic light-emitting diode display, surface-conduction electron-emitter display (SED), laser television, carbon nanotubes, quantum dot display, interferometric modulator display, or any other suitable equipment for displaying visual images. In some embodiments, display 312 may be HDTV-capable. In some embodiments, display 312 may be a 3D display, and the interactive media guidance application and any suitable content may be displayed in 3D. A video card or graphics card may generate the output to the display 312. The video card may offer various functions such as accelerated rendering of 3D scenes and 2D graphics, MPEG-2/MPEG-4 decoding, TV output, or the ability to connect multiple monitors. The video card may be any processing circuitry described above in relation to control circuitry 304. The video card may be integrated with the control circuitry 304. Speakers 314 may be provided as integrated with other elements of user equipment device 300 or may be stand-alone units. The audio component of videos and other content displayed on display 312 may be played through speakers 314. In some embodiments, the audio may be distributed to a receiver (not shown), which processes and outputs the audio via speakers 314.

The guidance application may be implemented using any suitable architecture. For example, it may be a stand-alone application wholly implemented on user equipment device 300. In such an approach, instructions of the application are stored locally (e.g., in storage 308), and data for use by the application is downloaded on a periodic basis (e.g., from an out-of-band feed, from an Internet resource, or using another suitable approach). Control circuitry 304 may retrieve instructions of the application from storage 308 and process the instructions to generate any of the displays discussed herein. Based on the processed instructions, control circuitry 304 may determine what action to perform when input is received from input interface 310. For example, movement of a cursor on a display up/down may be indicated by the processed instructions when input interface 310 indicates that an up/down button was selected.

In some embodiments, the media guidance application is a client-server based application. Data for use by a thick or thin client implemented on user equipment device 300 is retrieved on-demand by issuing requests to a server remote to the user equipment device 300. In one example of a client-server based guidance application, control circuitry 304 runs a web browser that interprets web pages provided by a remote server. For example, the remote server may store the instructions for the application in a storage device. The remote server may process the stored instructions using circuitry (e.g., control circuitry 304) and generate the displays discussed above and below. The client device may receive the displays generated by the remote server and may display the content of the displays locally on equipment device 300. This way, the processing of the instructions is performed remotely by the server while the resulting displays are provided locally on equipment device 300. Equipment device 300 may receive inputs from the user via input interface 310 and transmit those inputs to the remote server for processing and generating the corresponding displays. For example, equipment device 300 may transmit a communication to the remote server indicating that an up/down button was selected via input interface 310. The remote server may process instructions in accordance with that input and generate a display of the application corresponding to the input (e.g., a display that moves a cursor up/down). The generated display is then transmitted to equipment device 300 for presentation to the user.

In some embodiments, the media guidance application is downloaded and interpreted or otherwise run by an interpreter or virtual machine (run by control circuitry 304). In some embodiments, the guidance application may be encoded in the ETV Binary Interchange Format (EBIF), received by control circuitry 304 as part of a suitable feed, and interpreted by a user agent running on control circuitry 304. For example, the guidance application may be an EBIF application. In some embodiments, the guidance application may be defined by a series of JAVA-based files that are received and run by a local virtual machine or other suitable middleware executed by control circuitry 304. In some of such embodiments (e.g., those employing MPEG-2 or other digital media encoding schemes), the guidance application may be, for example, encoded and transmitted in an MPEG-2 object carousel with the MPEG audio and video packets of a program.

Figure 4:
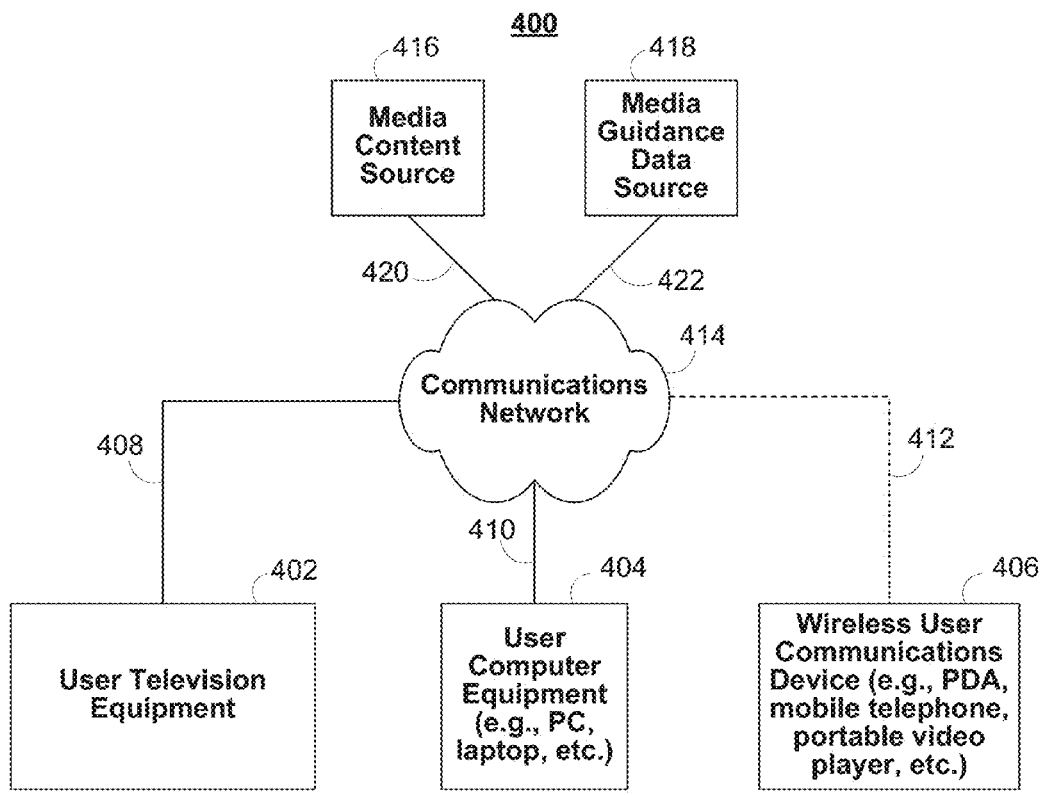
FIG. 4 is a block diagram of an illustrative media system in accordance with some embodiments of the disclosure.

User equipment device 300 of FIG. 3 can be implemented in system 400 of FIG. 4 as user television equipment 402, user computer equipment 404, wireless user communications device 406, or any other type of user equipment suitable for accessing content, such as a non-portable gaming machine. For simplicity, these devices may be referred to herein collectively as user equipment or user equipment devices, and may be substantially similar to user equipment devices described above. User equipment devices, on which a media guidance application may be implemented, may function as a standalone device or may be part of a network of devices. Various network configurations of devices may be implemented and are discussed in more detail below.

A user equipment device utilizing at least some of the system features described above in connection with FIG. 3 may not be classified solely as user television equipment 402, user computer equipment 404, or a wireless user communications device 406. For example, user television equipment 402 may, like some user computer equipment 404, be Internet-enabled allowing for access to Internet content, while user computer equipment 404 may, like some television equipment 402, include a tuner allowing for access to television programming. The media guidance application may have the same layout on various different types of user equipment or may be tailored to the display capabilities of the user equipment. For example, on user computer equipment 404, the guidance application may be provided as a web site accessed by a web browser. In another example, the guidance application may be scaled down for wireless user communications devices 406.

In system 400, there is typically more than one of each type of user equipment device but only one of each is shown in FIG. 4 to avoid overcomplicating the drawing. In addition, each user may utilize more than one type of user equipment device and also more than one of each type of user equipment device.

In some embodiments, a user equipment device (e.g., user television equipment 402, user computer equipment 404, wireless user communications device 406) may be referred to as a "second screen device." For example, a second screen device may supplement content presented on a first user equipment device. The content presented on the second screen device may be any suitable content that supplements the content presented on the first device. In some embodiments, the second screen device provides an interface for adjusting settings and display preferences of the first device. In some embodiments, the second screen device is configured for interacting with other second screen devices or for interacting with a social network. The second screen device can be located in the same room as the first device, a different room from the first device but in the same house or building, or in a different building from the first device.

The user may also set various settings to maintain consistent media guidance application settings across in-home devices and remote devices. Settings include those described herein, as well as channel and program favorites, programming preferences that the guidance application utilizes to make programming recommendations, display preferences, and other desirable guidance settings. For example, if a user sets a channel as a favorite on, for example, the web site www.allrovi.com on their personal computer at their office, the same channel would appear as a favorite on the user's in-home devices (e.g., user television equipment and user computer equipment) as well as the user's mobile devices, if desired. Therefore, changes made on one user equipment device can change the guidance experience on another user equipment device, regardless of whether they are the same or a different type of user equipment device. In addition, the changes made may be based on settings input by a user, as well as user activity monitored by the guidance application.

The user equipment devices may be coupled to communications network 414. Namely, user television equipment 402, user computer equipment 404, and wireless user communications device 406 are coupled to communications network 414 via communications paths 408, 410, and 412, respectively. Communications network 414 may be one or more networks including the Internet, a mobile phone network, mobile voice or data network (e.g., a 4G or LTE network), cable network, public switched telephone network, or other types of communications network or combinations of communications networks. Paths 408, 410, and 412 may separately or together include one or more communications paths, such as, a satellite path, a fiber-optic path, a cable path, a path that supports Internet communications (e.g., IPTV), free-space connections (e.g., for broadcast or other wireless signals), or any other suitable wired or wireless communications path or combination of such paths. Path 412 is drawn with dotted lines to indicate that in the exemplary embodiment shown in FIG. 4 it is a wireless path and paths 408 and 410 are drawn as solid lines to indicate they are wired paths (although these paths may be wireless paths, if desired). Communications with the user equipment devices may be provided by one or more of these communications paths, but are shown as a single path in FIG. 4 to avoid overcomplicating the drawing.

Although communications paths are not drawn between user equipment devices, these devices may communicate directly with each other via communication paths, such as those described above in connection with paths 408, 410, and 412, as well as other short-range point-to-point communication paths, such as USB cables, IEEE 1394 cables, wireless paths (e.g., Bluetooth, infrared, IEEE 802-11x, etc.), or other short-range communication via wired or wireless paths. BLUETOOTH is a certification mark owned by Bluetooth SIG, INC. The user equipment devices may also communicate with each other directly through an indirect path via communications network 414.

System 400 includes media content source 416 and media guidance data source 418 coupled to communications network 414 via communication paths 420 and 422, respectively. Paths 420 and 422 may include any of the communication paths described above in connection with paths 408, 410, and 412. Communications with the media content source 416 and media guidance data source 418 may be exchanged over one or more communications paths, but are shown as a single path in FIG. 4 to avoid overcomplicating the drawing. In addition, there may be more than one of each of media content source 416 and media guidance data source 418, but only one of each is shown in FIG. 4 to avoid overcomplicating the drawing. (The different types of each of these sources are discussed below.) If desired, media content source 416 and media guidance data source 418 may be integrated as one source device. Although communications between sources 416 and 418 with user equipment devices 402, 404, and 406 are shown as through communications network 414, in some embodiments, sources 416 and 418 may communicate directly with user equipment devices 402, 404, and 406 via communication paths (not shown) such as those described above in connection with paths 408, 410, and 412.

Media content source 416 may include one or more types of content distribution equipment including a television distribution facility, cable system headend, satellite distribution facility, programming sources (e.g., television broadcasters, such as NBC, ABC, HBO, etc.), intermediate distribution facilities and/or servers, Internet providers, on-demand media servers, and other content providers. NBC is a trademark owned by the National Broadcasting Company, Inc., ABC is a trademark owned by the American Broadcasting Company, Inc., and HBO is a trademark owned by the Home Box Office, Inc. Media content source 416 may be the originator of content (e.g., a television broadcaster, a Webcast provider, etc.) or may not be the originator of content (e.g., an on-demand content provider, an Internet provider of content of broadcast programs for downloading, etc.). Media content source 416 may include cable sources, satellite providers, on-demand providers, Internet providers, over-the-top content providers, or other providers of content. Media content source 416 may also include a remote media server used to store different types of content (including video content selected by a user), in a location remote from any of the user equipment devices. Systems and methods for remote storage of content, and providing remotely stored content to user equipment are discussed in greater detail in connection with Ellis et al., U.S. Pat. No. 7,761,892, issued Jul. 20, 2010, which is hereby incorporated by reference herein in its entirety.

Media guidance data source 418 may provide media guidance data, such as the media guidance data described above. Media guidance application data may be provided to the user equipment devices using any suitable approach. In some embodiments, the guidance application may be a stand-alone interactive television program guide that receives program guide data via a data feed (e.g., a continuous feed or trickle feed). Program schedule data and other guidance data may be provided to the user equipment on a television channel sideband, using an in-band digital signal, using an out-of-band digital signal, or by any other suitable data transmission technique. Program schedule data and other media guidance data may be provided to user equipment on multiple analog or digital television channels.

In some embodiments, guidance data from media guidance data source 418 may be provided to users' equipment using a client-server approach. For example, a user equipment device may pull media guidance data from a server, or a server may push media guidance data to a user equipment device. In some embodiments, a guidance application client residing on the user's equipment may initiate sessions with source 418 to obtain guidance data when needed, e.g., when the guidance data is out of date or when the user equipment device receives a request from the user to receive data. Media guidance may be provided to the user equipment with any suitable frequency (e.g., continuously, daily, a user-specified period of time, a system-specified period of time, in response to a request from user equipment, etc.). Media guidance data source 418 may provide user equipment devices 402, 404, and 406 the media guidance application itself or software updates for the media guidance application.

Media guidance applications may be, for example, standalone applications implemented on user equipment devices. For example, the media guidance application may be implemented as software or a set of executable instructions which may be stored in storage 308, and executed by control circuitry 304 of a user equipment device 300. In some embodiments, media guidance applications may be client-server applications where only a client application resides on the user equipment device, and server application resides on a remote server. For example, media guidance applications may be implemented partially as a client application on control circuitry 304 of user equipment device 300 and partially on a remote server as a server application (e.g., media guidance data source 418) running on control circuitry of the remote server. When executed by control circuitry of the remote server (such as media guidance data source 418), the media guidance application may instruct the control circuitry to generate the guidance application displays and transmit the generated displays to the user equipment devices. The server application may instruct the control circuitry of the media guidance data source 418 to transmit data for storage on the user equipment. The client application may instruct control circuitry of the receiving user equipment to generate the guidance application displays.

Content and/or media guidance data delivered to user equipment devices 402, 404, and 406 may be over-the-top (OTT) content. OTT content delivery allows Internet-enabled user devices, including any user equipment device described above, to receive content that is transferred over the Internet, including any content described above, in addition to content received over cable or satellite connections. OTT content is delivered via an Internet connection provided by an Internet service provider (ISP), but a third party distributes the content. The ISP may not be responsible for the viewing abilities, copyrights, or redistribution of the content, and may only transfer IP packets provided by the OTT content provider. Examples of OTT content providers include YOUTUBE, NETFLIX, and HULU, which provide audio and video via IP packets. Youtube is a trademark owned by Google Inc., Netflix is a trademark owned by Netflix Inc., and Hulu is a trademark owned by Hulu, LLC. OTT content providers may additionally or alternatively provide media guidance data described above. In addition to content and/or media guidance data, providers of OTT content can distribute media guidance applications (e.g., web-based applications or cloud-based applications), or the content can be displayed by media guidance applications stored on the user equipment device.

Media guidance system 400 is intended to illustrate a number of approaches, or network configurations, by which user equipment devices and sources of content and guidance data may communicate with each other for the purpose of accessing content and providing media guidance. The embodiments described herein may be applied in any one or a subset of these approaches, or in a system employing other approaches for delivering content and providing media guidance. The following four approaches provide specific illustrations of the generalized example of FIG. 4.

In one approach, user equipment devices may communicate with each other within a home network. User equipment devices can communicate with each other directly via short-range point-to-point communication schemes described above, via indirect paths through a hub or other similar device provided on a home network, or via communications network 414. Each of the multiple individuals in a single home may operate different user equipment devices on the home network. As a result, it may be desirable for various media guidance information or settings to be communicated between the different user equipment devices. For example, it may be desirable for users to maintain consistent media guidance application settings on different user equipment devices within a home network, as described in greater detail in Ellis et al., U.S. patent application Ser. No. 11/179,410, filed Jul. 11, 2005. Different types of user equipment devices in a home network may also communicate with each other to transmit content. For example, a user may transmit content from user computer equipment to a portable video player or portable music player.

In a second approach, users may have multiple types of user equipment by which they access content and obtain media guidance. For example, some users may have home networks that are accessed by in-home and mobile devices. Users may control in-home devices via a media guidance application implemented on a remote device. For example, users may access an online media guidance application on a website via a personal computer at their office, or a mobile device such as a PDA or web-enabled mobile telephone. The user may set various settings (e.g., recordings, reminders, or other settings) on the online guidance application to control the user's in-home equipment. The online guide may control the user's equipment directly, or by communicating with a media guidance application on the user's in-home equipment. Various systems and methods for user equipment devices communicating, where the user equipment devices are in locations remote from each other, is discussed in, for example, Ellis et al., U.S. Pat. No. 8,046,801, issued Oct. 25, 2011, which is hereby incorporated by reference herein in its entirety.

In a third approach, users of user equipment devices inside and outside a home can use their media guidance application to communicate directly with content source 416 to access content. Specifically, within a home, users of user television equipment 402 and user computer equipment 404 may access the media guidance application to navigate among and locate desirable content. Users may also access the media guidance application outside of the home using wireless user communications devices 406 to navigate among and locate desirable content.

In a fourth approach, user equipment devices may operate in a cloud computing environment to access cloud services. In a cloud computing environment, various types of computing services for content sharing, storage or distribution (e.g., video sharing sites or social networking sites) are provided by a collection of network-accessible computing and storage resources, referred to as "the cloud." For example, the cloud can include a collection of server computing devices, which may be located centrally or at distributed locations, that provide cloud-based services to various types of users and devices connected via a network such as the Internet via communications network 414. These cloud resources may include one or more content sources 416 and one or more media guidance data sources 418. In addition or in the alternative, the remote computing sites may include other user equipment devices, such as user television equipment 402, user computer equipment 404, and wireless user communications device 406. For example, the other user equipment devices may provide access to a stored copy of a video or a streamed video. In such embodiments, user equipment devices may operate in a peer-to-peer manner without communicating with a central server.

The cloud provides access to services, such as content storage, content sharing, or social networking services, among other examples, as well as access to any content described above, for user equipment devices. Services can be provided in the cloud through cloud computing service providers, or through other providers of online services. For example, the cloud-based services can include a content storage service, a content sharing site, a social networking site, or other services via which user-sourced content is distributed for viewing by others on connected devices. These cloud-based services may allow a user equipment device to store content to the cloud and to receive content from the cloud rather than storing content locally and accessing locally-stored content.

A user may use various content capture devices, such as camcorders, digital cameras with video mode, audio recorders, mobile phones, and handheld computing devices, to record content. The user can upload content to a content storage service on the cloud either directly, for example, from user computer equipment 404 or wireless user communications device 406 having content capture feature. Alternatively, the user can first transfer the content to a user equipment device, such as user computer equipment 404. The user equipment device storing the content uploads the content to the cloud using a data transmission service on communications network 414. In some embodiments, the user equipment device itself is a cloud resource, and other user equipment devices can access the content directly from the user equipment device on which the user stored the content.

Cloud resources may be accessed by a user equipment device using, for example, a web browser, a media guidance application, a desktop application, a mobile application, and/or any combination of access applications of the same. The user equipment device may be a cloud client that relies on cloud computing for application delivery, or the user equipment device may have some functionality without access to cloud resources. For example, some applications running on the user equipment device may be cloud applications, i.e., applications delivered as a service over the Internet, while other applications may be stored and run on the user equipment device. In some embodiments, a user device may receive content from multiple cloud resources simultaneously. For example, a user device can stream audio from one cloud resource while downloading content from a second cloud resource. Or a user device can download content from multiple cloud resources for more efficient downloading. In some embodiments, user equipment devices can use cloud resources for processing operations such as the processing operations performed by processing circuitry described in relation to FIG. 3.

Figure 5A:
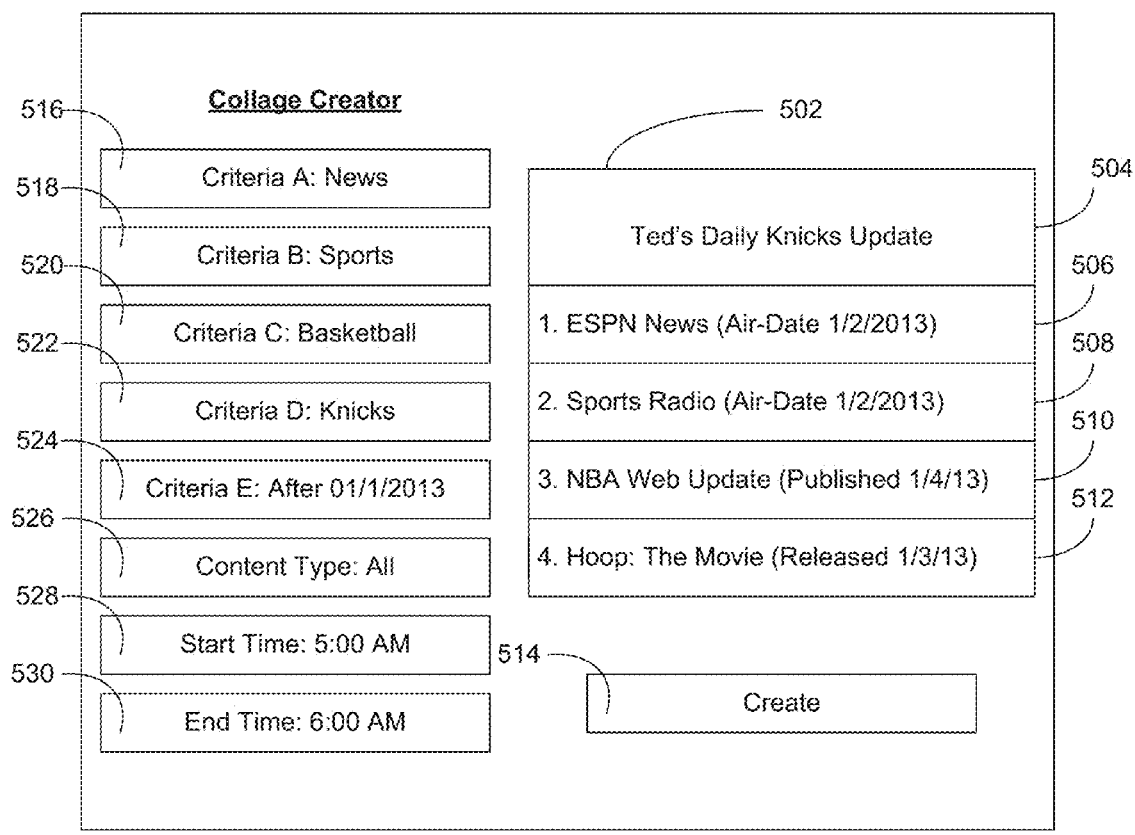
FIG. 5A shows an illustrative example of a collage creator display in a media guidance application in accordance with some embodiments of the disclosure.

FIG. 5A shows an illustrative example of a collage creator display in a media guidance application. For example, display 500 may represent an interface used by a user to create, transfer, store, retrieve, and/or modify a collage of media assets. Display 500 may appear on one or more user devices (e.g., any of the devices listed in FIGS. 3-4 below). Moreover, the media guidance application may use one or more steps from one or more of the processes described in FIGS. 6-7 below to generated display 500 or any of the features described therein.

FIG. 5A includes display 500. Display 500 may appear on a display device (e.g., user equipment devices 402, 404, and/or 406 (FIG. 4) above). Furthermore, control circuitry 304 as described above in relation to FIG. 3 may be used to generate display 500. Display 500 includes playlist 502. Playlist 502 includes media assets 506, 508, 510, and 512, which may appear or simultaneous consumption to the user in a collage. For example, the media assets in playlist 502 may correspond to media assets that were selected by the media guidance application from a group of media assets to represent the group (e.g., as discussed below in relation to FIGS. 6-7). In some embodiments, media assets 506, 508, 510, and 512 may correspond to media assets received from several sources (e.g., media content source 414, user equipment devices 402, 404, and/or 406, and/or any device accessible from communications network 414 (FIG. 4)). For example, media asset 506 may represent a broadcast television show. Media asset 508 may represent a broadcasted radio program. Media asset 510 may represent a posting on a website, and media asset 512 may represent a VOD offering.

Playlist 502 also includes title display 504. For example, title display 504 may be used by a user to create, transfer, store, retrieve, and/or modify the playlist or the media assets in the playlist. In some embodiments, the media guidance application may retrieve playlist 502, and any media assets included in playlist 502 from local (e.g., storage 308 (FIG. 3)) or remote (e.g., media content source 416 (FIG. 4)) storage.

Display 500 also includes numerous options for creating a collage (e.g., featuring media assets in playlist 502). For example, playlist 502 is created (e.g., via a user input of create option 514) in response to values entered (e.g., via user input interface 310 (FIG. 3)) into criteria options 516, 518, 520, 522, and 524. For example, criteria option 516 indicates that playlist 502 will relate to "News." Criteria option 518 indicates that playlist 502 will relate to "Sports." Criteria option 520 indicates that playlist 502 will relate to "Basketball." Criteria option 522 indicates that playlist 502 will relate to "Knicks," and criteria option 524 indicates that playlist 502 will relate to content "After Jan. 1, 2013." In response, the media guidance application searches (e.g., as discussed below in relation to FIGS. 6-7) for content related to news about the New York Knicks basketball team that was received after Jan. 1, 2013 and populates playlist 502 with media assets related to that content.

The media guidance application may include numerous options for searching and presenting media assets. For example, the media guidance application may include options (e.g., content type option 526) for indicating a type of content (e.g., audio, video, image, textual data, etc.) that should be used to populate playlist 502. For example, content type option 526 currently indicates "All" resulting in the playlist being populated with video (media assets 506 and media asset 512), audio (media asset 508), and textual data (media asset 510).

It should be noted that in the case of a media asset without a defined play length (e.g., a textual article posted on a website), the media guidance application may determine a play length. For example, the media guidance application may determine (e.g., via control circuitry 304 (FIG. 3)) an amount of time (e.g., twenty seconds) that the media asset (e.g., media asset 510) should be presented in playlist 502. In some embodiments, the media guidance application may base the determined play length on the length of time a user (e.g., as indicated in a user profile stored on storage 308 (FIG. 3) of media guidance data source 418 (FIG. 4)) needs to view the media asset.

Display 500 also includes an option for indicating a time period associated with presenting a collage based on playlist 502. For example, start time option 528 indicates that the collage based on playlist 502 begins at 5:00 AM, and end time option 530 indicates that collage based on playlist 502 ends at 6:00 AM (e.g., corresponding to a time each day that a user gets ready or work). In some embodiments, the media guidance application may further receive an indicator of a particular day, week, and/or month for presenting (or not presenting) the collage based on playlist 502. For example, the media guidance application may present a collage based on a playlist of home videos on the birthday of a user. In another example, the media guidance application may present a collage on weekdays only. Furthermore, the media guidance application may crop one or more media assets, show abbreviated versions, or otherwise modify the media assets such that the media assets appearing in the collage correspond to the time period.

In some embodiments, the media guidance application may allow a user to further define a date range for media assets appearing in playlist 502. For example, criteria option 524 indicates that the collage will relate to content "After Jan. 1, 2013." In some embodiments, criteria option 524 may further be used to designate a date range of content that should be used to populate playlist 502 for the collage. For example, the media guidance application may generate a media playlist of media assets concerning a particular topic that occurred in the past week.

In some embodiments, the media guidance application may generate a playlist (e.g., playlist 502), which includes media assets matching one or more criteria (e.g., criteria options 516, 518, 520, 522, and 524). For example, a given media playlist may include media assets that each correspond to all the criteria. Additionally or alternatively, a given playlist may include media assets that each correspond to at least one criteria (e.g., criteria options 516, 518, 520, 522, or 524). Additionally or alternatively, media assets in playlist 502 may correspond to media assets that were selected from a group of media assets to represent the group.

In some embodiments, the media guidance application may rank selected media assets (and/or the groups rom which they are selected) according to the number of criteria (e.g., criteria options 516, 518, 520, 522, and 524) to which each media asset corresponds (e.g., as discussed below in relation to FIG. 7). For example, the media assets selected by the media guidance application for inclusion in the media playlist (e.g., playlist 502) coming from a group having the highest ranking (e.g., corresponded to the most number of criteria) may be presented in the largest size, in a high definition format, with corresponding audio output, in the foreground of the collage, etc.

In some embodiments, the media guidance application may rank more current (i.e. media assets that were broadcasted/released/published closest to the current date) higher. For example, all other criteria being equal, the media guidance application may rank a live broadcast of a media asset over a media asset broadcasted a week earlier. In some embodiments, the media guidance application may further display the ranking of each media asset to the user.

In some embodiments, the media guidance application may further assign a quality to each available media asset. For example, the quality of the media asset may correspond to the popularity or rating of the media asset (e.g., as determined by comments received via social media, industrial rating services, real-time surveys, etc.). In some embodiments, the quality of the media asset may further correspond to length of time of the play length of each media asset that corresponds to the criteria.

As described below, in some embodiments, the media guidance application may crop media assets to ensure that the media assets selected for the playlist conform to a specific play length. In such cases, the media asset that is cropped and the amount of time that is cropped from that media asset may depend on the quality of the media asset. For example, the media guidance application may determine to crop a media asset with a high quality very little, but determine to crop a media asset with a low quality substantially more. In some embodiments, the media guidance application may notify a user (e.g., via an on-screen prompt) before cropping one or more media assets.

In some embodiments, the media guidance application may also insert locally stored or pre-rendered buffer content. For example, if the media guidance application cannot locate enough media assets (or media assets with enough play length) to fill the entire time period for one or more of the selected media assets, the media guidance application may insert pre-rendered videos or images received/retrieved from a user device (e.g., user equipment device 402, 404, and/or 406 (FIG. 4)) or a remote location (e.g., content source 416 and/or media guidance data source 418 (FIG. 4)). In some embodiments, the media guidance application may notify a user (e.g., via an on-screen prompt) of the lack of available media assets meeting the criteria and provide options as to whether buffer content should be included or the play length of the collage should be shortened.

In some embodiments, display 500, or a portion of display 500, may appear with the presentation of media assets 506, 508, 510, and 512. For example, while the playlist is presented to a user, display 500 may appear as an overlay on a display screen of a user device (e.g., user equipment device 402, 404, and/or 406 (FIG. 4)). Additionally or alternatively, display 500 may appear as a pop-up upon receipt of a user input (e.g., via user input interface 304 (FIG. 3)).

It should be noted that display 500 is illustrative only and some embodiments may feature displays with additional (or less) options and/or features.

Figure 5B:
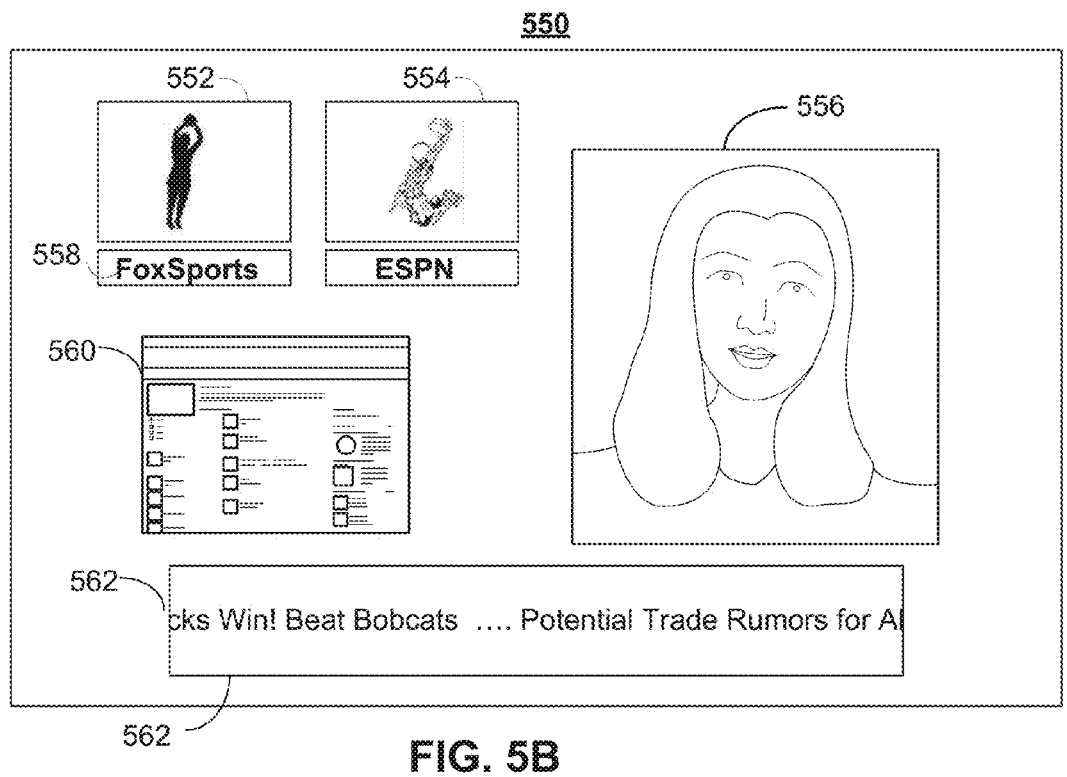
FIG. 5B shows an illustrative example of a collage generated for display in a media guidance application in accordance with some embodiments of the disclosure.

FIG. 5B shows an illustrative example of a collage of media assets generated for display by a media guidance application. For example, display 550 may represent an interface used by a user access multiple media assets simultaneously. Display 550 may appear on one or more user devices (e.g., any of the devices listed in FIGS. 3-4 below). Moreover, the media guidance application may use one or more steps from one or more of the processes described in FIGS. 6-7 below to generated display 500 or any of the features described therein. For example, to determine the accentuations for various media assets in display 550, the media guidance application (e.g., via control circuitry 304 (FIG. 4)) may select the size, position, video quality, audio quality, format, style, and/or any other attribute describing how a media asset is presented. In some embodiments, the accentuations may correspond to a rank, user preference, or interest level associated with the media asset as determined by the media guidance application (e.g., via control circuitry 304 (FIG. 3)). Furthermore, the media guidance application may (e.g., via control circuitry 304 (FIG. 3)) alter the accentuations based on user activity (e.g., user selections selecting a media asset, changes to user criteria (e.g., via display 500 (FIG. 5B), etc.) and/or changes to rank, user preferences, or interest levels associated with the media asset while the collage of media assets is presented.

FIG. 5B includes 550 video media assets 552, 554, and 556 and textual media assets 560 and 562. For example, the media assets shown in display 550 may represent media assets selected to represent groups of media assets categorized by a media guidance application based on similar characteristics. As shown in display 550, the accentuations associated with video media assets 552, 554, and 556 are different. For example, video media asset 556 is presented in a larger size than video media asset 552 and 554. In some embodiments, the difference in size may be based on the media guidance application determining that the quality of the group from which video media asset 556 was selected is higher than the quality of the group from which video media assets 52 and 554 are selected.

In FIG. 5B, video media assets 552, 554, and 556 and textual media assets 560 and 562 have various accentuations. It should also be noted that an audio media asset (e.g., a media asset that consists of only audio data) that is presented using the audio output capabilities (e.g., speakers 314 (FIG. 3)) of a user device (e.g., user device 300 (FIG. 3)) upon which the media guidance application is implemented may also be simultaneously generated for presentation to a user by the media guidance application. For example, while display 550 shows the various displays of media assets, a user may also be hearing one or more media assets (e.g., corresponding to radio broadcasts or the audio data associated with one or more of the media assets displayed in display 550).

In some embodiments, the accentuation of the video media assets 552, 554, and 556 may be changed based on a user action. For example, the media guidance application may generate for display video media assets 552, 554, and 556 for simultaneous consumption in the collage shown in display 550. Each of video media assets 552, 554, and 556 may be presented with initial sizes and without audio content (or only one media asset (e.g., video media asset 556) may be presented with audio content). However, in response to a particular media asset being selected by a user (e.g., video media asset 552), the media guidance application may generate for display video media asset 552 in a larger size than video media asset 556 and may present the audio output for video media asset 552 (e.g., instead of video media asset 556).

The media guidance application may arrange media assets in a collage in various manners. For example, video media assets 552, 554, and 556 are arranged side-by-side in display 500 (e.g., corresponding to an order of a ranking). Additionally or alternatively, media assets in display 550 may be presented overlaying one another, in various states of transparency, in separate windows of various shapes, and/or any other arrangement or positioning. For example, if display 550 is capable of holographic or three-dimensional displays (or configured to present displays that otherwise appear to have depth), video media assets 552, 554, and 556 may appear at various depths in display 550. In some embodiments, the arrangement or positioning may indicate the rank associated with a group from which the media asset was selected.

Display 550 may also display media assets in various styles. For example, textual media asset 560 is displayed as a web-site screenshot, whereas textual media asset 562 is displayed as a ticker overlay on display 550. In some embodiments, the media guidance application (e.g., via control circuitry 304 (FIG. 3)) may determine the style in which to present the media asset. For example, although two media assets are both text based, the media guidance application may present the text in different forms (e.g., tickers, screenshots, document viewing file formats, etc.). Likewise, video media assets 552 and 554 may appear in standard-definition formats, while video media asset 556 appears in high-definition format.

In some embodiments, the style of a media asset may not conform to its native style. That is, the style of the media asset as presented in display 550 may not correspond to the style of the media asset as it would be presented when not presented in display 550. For example, the media guidance application (e.g., via control circuitry 304) may select two video media assets. However, instead of generating for display two video media assets in display 550, the media guidance application may determine (e.g., via control circuitry 304 (FIG. 3)) to generate a first video media asset as a video in display 550 and display a second video media asset as an audio output only.

In another example, the media guidance application (e.g., via control circuitry 304 (FIG. 3)) may determine to present the second video media asset as a textual media asset only. For example, the media guidance application may determine to retrieve closed-captioning data associated with the second media asset and present the closed-captioning data on-screen (e.g., as textual media asset 562) instead of presenting the second video media asset as a video. In some embodiments, the selection of a particular style may be based on a quality associated with a group from which a selected media asset was selected. For example, if a first selected media asset is associated with a group with a higher quality than a second selected media asset, the media guidance application (e.g., via control circuitry 304 (FIG. 3)) may generate for display the first selected media asset as a video and generate for display the second selected media asset as on-screen text.

Figure 6:
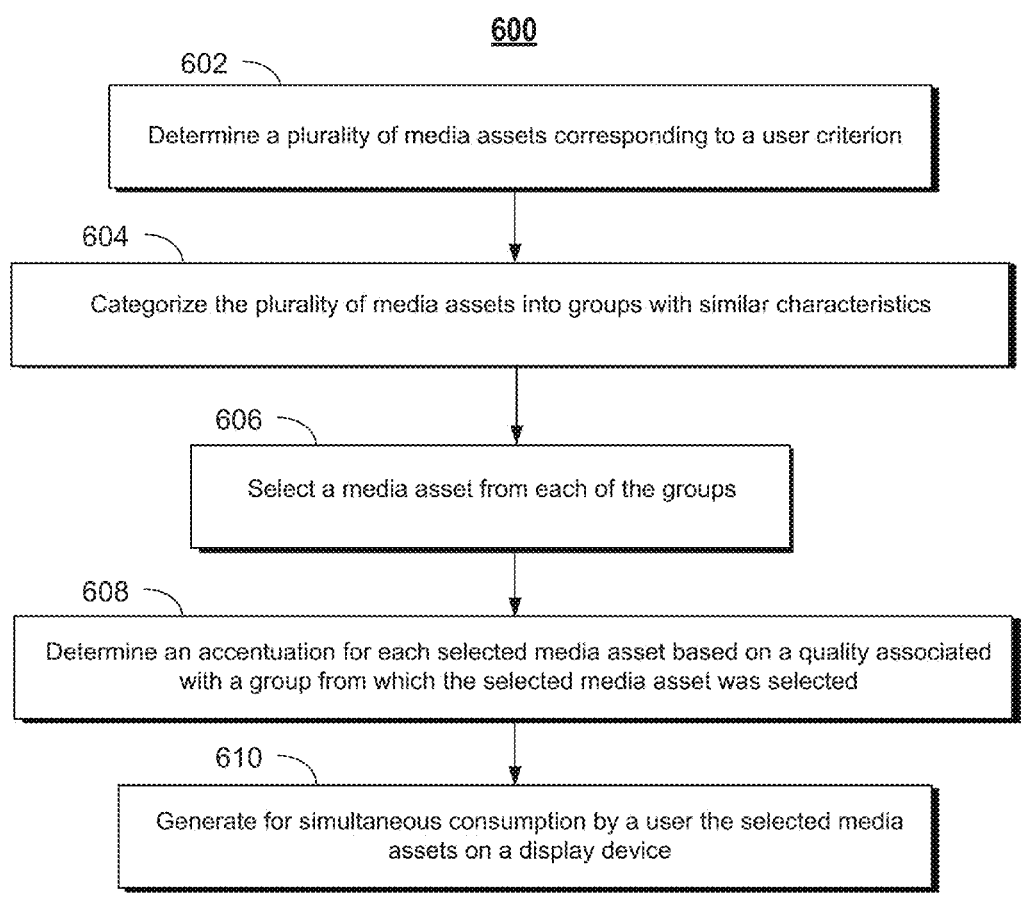
FIG. 6 is a flowchart of illustrative steps for generating for display a collage of media assets in accordance with some embodiments of the disclosure.

FIG. 6 is a flowchart of illustrative steps for generating for display a collage of media assets. Process 600 may be used to select a media asset (e.g., media asset 506 of playlist 502 (FIG. 5)) on display device (e.g., display 500 (FIG. 5)). It should be noted that process 600 or any step thereof, could occur on, or be provided by, any of the devices shown in FIGS. 3-4. For example, process 700 may be executed by control circuitry 304 (FIG. 3) as instructed by the media guidance application (e.g., implemented on any of the devices shown and described in FIG. 4).

At step 602, the media guidance application determines a plurality of media assets corresponding to a user criterion. For example, in some embodiments the collage creator may be initiated upon a user selecting (e.g., via user input interface 310 (FIG. 3)) a selectable option (e.g., selectable option 204 (FIG. 2)) on a display (e.g., display 200 (FIG. 2)). In some embodiments, the media guidance application may receive the user criterion via user input interface circuitry coupled to control circuitry 304 (FIG. 3)). The media guidance application then cross-references the user criterion with a database (e.g., stored at storage 308 (FIG. 3) and/or any location accessible via communications network 414 (FIG. 4)) of available media to determine the plurality of media assets corresponding to the user criterion. For example, in response to a user request to search cable, satellite, Internet, and/or any other communication medium for media assets associated with "Bart Simpson," the media guidance application may conduct one or more searches via one or more search engines to retrieve available media assets associated with Bart Simpson.

At step 604, the media guidance application categorizes the plurality of media assets into groups with similar characteristics. For example, if the media guidance application receives (e.g., via I/O path 302 (FIG. 3)) a media asset (e.g., video media asset 552 (FIG. 5B)) with the same content (e.g., an associated press article published by various news outlets), the media guidance application (e.g., using control circuitry 304 (FIG. 3)) categorizes all of these media assets together. In another example, if the media guidance application determines (e.g., via control circuitry 304 (FIG. 3)) that several media assets originated from the same source (e.g., a report on a producer of television broadcasts, internet articles, and radio announcements), the media guidance application may (e.g., via control circuitry 304 (FIG. 3)) categorize these media assets together as well.

At step 606, the media guidance application may selects a media asset from each of the groups. For example, when generating or display a collage of media assets for simultaneous consumption by a user, the media guidance application may only show a single media asset associated with a group of media assets. The media guidance application may (e.g., via control circuitry 304 (FIG. 3)) select a media asset (e.g., a media asset listed in playlist 502 (FIG. 5)) that is representative of the content, information, and/or point of view related to the user criterion (e.g., as entered via criteria option 516 (FIG. 5A)) associated with the group.

At step 608, the media guidance application may determine an accentuation for each selected media asset based on a quality associated with a group from which the selected media asset was selected. For example, the media guidance application may (e.g., via control circuitry 304 (FIG. 3)) determine a position, size, highlight, etc. for the selected media asset (e.g., video media asset 556 (FIG. 5B)) in the collage of media assets (e.g., as displayed in display 550 (FIG. 5B)) based on the popularity of the media assets in a group from which the media asset was selected. Alternatively or additionally, the media guidance application may (e.g., via control circuitry 304 (FIG. 3)) determine the number of media assets in the group, the popularity of sources in the group, or any other quality associated with the group.

For example, the media guidance application may determine the popularity (e.g., based on clickstream data, industry ratings, social media posts), reliability (e.g., based on user reviews, industry metrics, number of accolades, etc.), and/or other quantifiable characteristic associated with the one or more sources in the group. In such cases, the media guidance application may rank the repositories from which media assets are accessed. For example, repositories may include, but are not limited to, content providers (or databases associated with content providers) but also delivery networks. For example, delivery networks may be measured by their bandwidth, speed, connectivity, reliability of service, system requirements, etc.

At step 610, the media guidance application generates for simultaneous consumption by a user the selected media assets on a display device (e.g., display 312 (FIG. 3)) with the determined accentuation. For example, the media guidance application may generate a collage of media assets (e.g., as shown in display 550 (FIG. 5B)), in which each media asset has the determined accentuation.

It is contemplated that the steps or descriptions of FIG. 6 may be used with any other embodiment of this disclosure. In addition, the steps and descriptions described in relation to FIG. 6 may be done in alternative orders or in parallel to further the purposes of this disclosure. For example, each of these steps may be performed in any order or in parallel or substantially simultaneously to reduce lag or increase the speed of the system or method.

Figure 7:
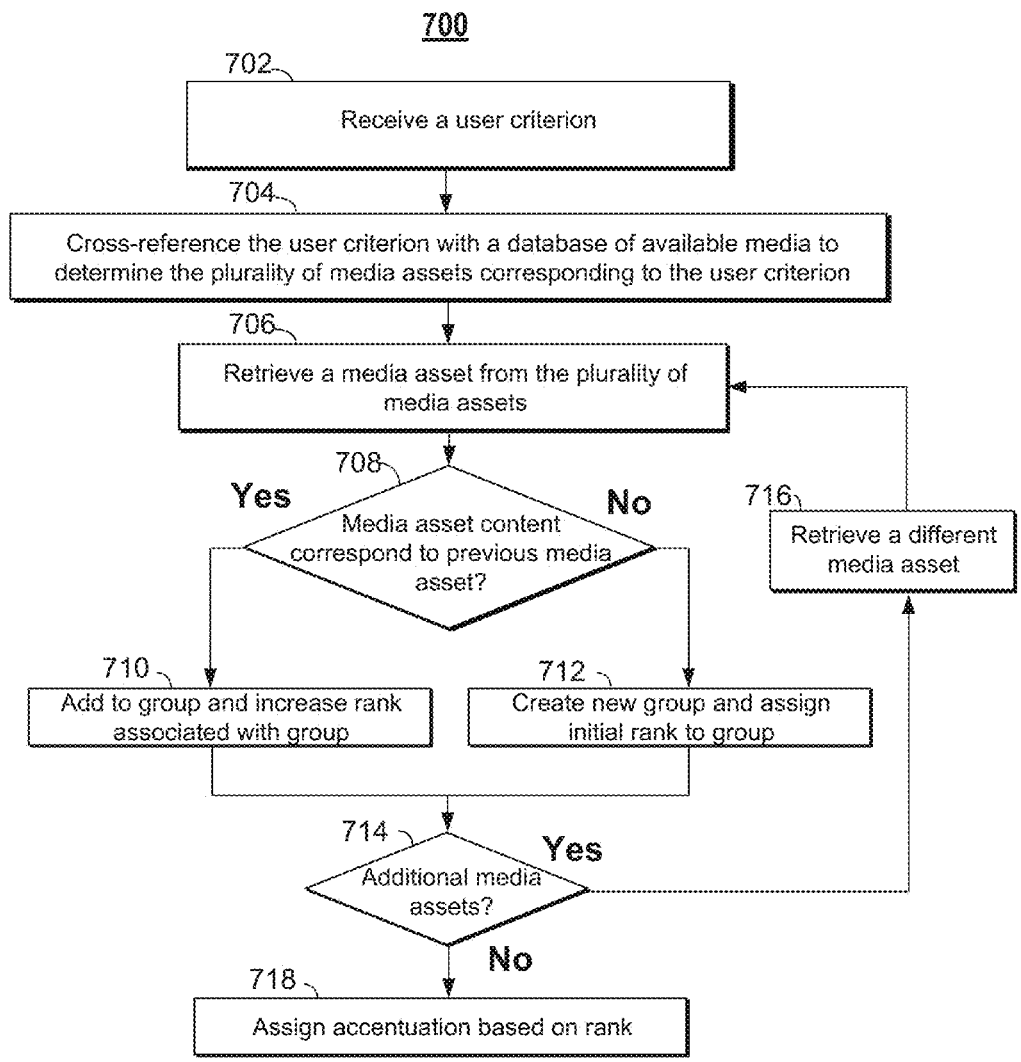
FIG. 7 is a flowchart of illustrative steps for selecting accentuations for media assets in a collage in accordance with some embodiments of the disclosure.

FIG. 7 is a flowchart of illustrative steps for selecting accentuations for media assets in a collage. Process 700 may be used to present a media asset (e.g., video media asset 554 (FIG. 5B)) on display device (e.g., display 312 (FIG. 3)). It should be noted that process 700 or any step thereof, could occur on, or be provided by, any of the devices shown in FIGS. 3-4. For example, process 700 may be executed by control circuitry 304 (FIG. 3) as instructed by the media guidance application (e.g., implemented on any of the devices shown and described in FIG. 4).

At step 702, the media guidance application receives (e.g., via user input interface 310 (FIG. 3)) the user criterion. For example, the media guidance application may receive a user input requesting the media guidance application perform a search (e.g., using control circuitry 304 (FIG. 3)) for a particular search term. In another example, the media guidance application may receive (e.g., via a user input interface 310 (FIG. 3)) values entered into fields (e.g., criteria options 516, 518, 520, 522, and 524 (FIG. 5A)) of a menu (e.g., display 500 (FIG. 5A)).

At step 704, the media guidance application cross-references the user criterion with a database (e.g., located at storage circuitry 308 (FIG. 3) and/or any location accessible via communications network 414 (FIG. 4)) of available media to determine the plurality of media assets corresponding to the user criterion. For example, in response to a user request to search for media assets associated with "Hot Electronic Deals," the media guidance application may conduct one or more searches via one or more search engines to retrieve available media assets associated current sales, coupons, or promotions available from various sources.

At step 706, the media guidance application retrieves all available media assets corresponding to the user criterion. For example, the media guidance application may receive (e.g., via I/O path 302 (FIG. 3)) one or more media assets in which the content or data associated with the media asset corresponds to the user criterion.

In some embodiments, the characteristics associated with a media asset may be determined prior to, concurrently with, or after receiving a media asset. For example, the media guidance application may access data describing all available media assets. This information may be stored in local (e.g., storage 308 (FIG. 3)) or remote (e.g., any location accessible via communications network 414 (FIG. 4)). In another example, the media guidance application may access data associated with the media asset (e.g., metadata) that describes the media asset. As the media assets or the associated data are accessed, the media guidance application may (e.g., via control circuitry 304 (FIG. 3)) compare the data to the user criterion. In yet another example, the media guidance application may determine the characteristics of a media asset by processing the media asset.

For example, the media guidance application may determine the information associated with the media asset by applying one or more content recognition techniques to the media asset. For example, the media guidance application may use a content recognition module or algorithm to generate data describing the context, content, and/or any other data necessary for determining information about a media asset. For example, the content recognition module may use object recognition techniques such as edge detection, pattern recognition, including, but not limited to, self-learning systems (e.g., neural networks), optical character recognition, on-line character recognition (including but not limited to, dynamic character recognition, real-time character recognition, intelligent character recognition), and/or any other suitable technique or method to determine objects in the media asset. For example, the media guidance application may receive data in the form of a video. The video may include a series of frames. For each frame of the video, the media guidance application may use a content recognition module or algorithm to determine the objects (e.g., people, places, things, etc.) in each of the frames or series of frames, which may be used to determine information about the media asset. For example, based on the detection of a multitude of explosions in the frames, the media guidance application may determine the circumstances of the media asset include action scenes. The media guidance application may then compare this determination to the user preference criteria to determine that the media asset contains action scenes and/or is part of the action genre.

In some embodiments, the content recognition module or algorithm may also include speech recognition techniques, including, but not limited to, Hidden Markov Models, dynamic time warping, and/or neural networks (as described above) to translate spoken words into text and/or processing audio data. The content recognition module may also combine multiple techniques to determine information about the media asset.

In addition, the media guidance application may use multiple types of optical character recognition and/or fuzzy logic, for example, when processing keyword(s) retrieved from data (e.g., textual data, translated audio data, user inputs, etc.) describing the media asset (or when cross-referencing various types of data in databases). For example, if the particular data received is textual data, using fuzzy logic, the media guidance application (e.g., via a content recognition module or algorithm incorporated into, or accessible by, the media guidance application) may determine two fields and/or values to be identical even though the substance of the data or value (e.g., two different spellings) is not identical. In some embodiments, the media guidance application may analyze particular received data of a data structure or media asset frame for particular values or text using optical character recognition methods described above in order to determine information about a media asset. For example, the media guidance application may process subtitles of the media asset to find particular characters or events that occur in the media asset.

At step 706, the media guidance application retrieves a media asset. For example, the media guidance application (e.g., via control circuitry 304 (FIG. 3)) retrieves a first media asset from the available media assets that match the user criterion and proceeds to step 708.

At step 708, the media guidance application determines whether or not the media asset corresponds to a media asset that has previously been processed. For example, the media guidance application may perform (e.g., via control circuitry 304 (FIG. 3)) multiple iterations to process all of the available media assets. As the media guidance application performs the multiple iterations, the media guidance application determines whether or not a media asset has characteristics similar to those of another media asset such that the two media asset should be included in the same group.

If a retrieved media asset has enough similar characteristics as a previously processed media asset, the media guidance application (e.g., via control circuitry 304 (FIG. 3)) assigns the media asset to a preexisting group featuring media assets with similar characteristics and increases the ranking of the group at step 710. If the retrieved media asset does not have enough similar characteristics as a previously processed media asset, the media guidance application (e.g., via control circuitry 304 (FIG. 3)) assigns the media asset to a new group and assigns the group an initial or default rank at step 712.

At step 714, the media guidance application determines (e.g., via control circuitry 304 (FIG. 3)) if there are more additional available media assets, the media guidance application proceeds to step 716 and retrieves a different media asset before returning to step 706. If there are no more additional media assets, the media guidance application proceeds to step 718 and assigns an accentuation based on the rank. In some embodiments, step 718 may correspond to step 608 of process 600 (FIG. 6)).

For example, the media guidance application may (e.g., via control circuitry 304 (FIG. 3)) determine the accentuation for each selected media asset based on the quality associated with the group from which the selected media asset was selected by ranking the various groups of media assets. For example, the media guidance application may determine (e.g., using control circuitry 304 (FIG. 3)) a first quality associated with a first group and determine (e.g., using control circuitry 304 (FIG. 3)) a second quality associated with a second group. The media guidance application may then determine (e.g., using control circuitry 304 (FIG. 3)) a first rank for the first group and a second rank for the second group based on the first quality and the second quality, in which the first rank is higher than the second rank.

The media guidance application may then select (e.g., via control circuitry 304 (FIG. 3)) a first accentuation that corresponds to the first rank and a second accentuation that corresponds to the second rank, in which the first accentuation is greater than the second accentuation. In some embodiments, the accentuations that map to particular ranks may be stored (e.g., in storage 308 (FIG. 3)). Upon determining (e.g., via control circuitry 304 (FIG. 3)) that a selected media asset has a particular rank, the media guidance application may apply the corresponding accentuation.

It is contemplated that the steps or descriptions of FIG. 7 may be used with any other embodiment of this disclosure. In addition, the steps and descriptions described in relation to FIG. 7 may be done in alternative orders or in parallel to further the purposes of this disclosure. For example, each of these steps may be performed in any order or in parallel or substantially simultaneously to reduce lag or increase the speed of the system or method.

The above-described embodiments of the present disclosure are presented for purposes of illustration and not of limitation, and the present disclosure is limited only by the claims which follow. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted, the systems and/or methods described above may be applied to, or used in accordance with, other systems and/or methods.

What is claimed is:

1. A method of generating for display customized collages of media content, the method comprising:
   determining, using control circuitry, a plurality of media assets corresponding to a user criterion;
   after determining the plurality of media assets, comparing characteristics of a first media asset of the plurality of media assets to characteristics of a second media asset of the plurality of media assets;
   in response to determining that the characteristics of the first media asset correspond to the characteristics of the second media asset, categorizing, using the control circuitry, the first and the second media assets into a first group of a plurality of groups with similar characteristics;

in response to determining that the characteristics of the first media asset do not correspond to the characteristics of the second media asset, categorizing, using the control circuitry, the first media asset into the first group and the second media asset into a second group of a plurality of groups;

selecting, using the control circuitry, a media asset from each of the groups;

determining, using the control circuitry, an accentuation for each selected media asset based on a quality associated with a group from which the selected media asset was selected; and generating for simultaneous consumption by a user the selected media assets on a display device with the determined accentuation.

2. The method of claim 1, further comprising:
receiving, via user input interface circuitry, the user criterion; and
cross-referencing the user criterion with a database of available media to determine the plurality of media assets corresponding to the user criterion.

3. The method of claim 1, wherein the similar characteristics include similar content, similar content types, or similar content sources, and wherein the quality associated with the group from which the selected media asset was selected includes a number of media assets in each group, a popularity of media assets in each group, or a popularity of sources of media assets in each group.

4. The method of claim 1, further comprising cross-referencing the quality associated with the group from which the selected media asset was selected with a database mapping qualities to accentuations to determine the accentuation for each selected media asset.

5. The method of claim 1, wherein determining the accentuation for each selected media asset based on the quality associated with the group from which the selected media asset was selected, further comprises:
determining a first quality associated with the first group;
determining a second quality associated with the second group;
determining a first rank for the first group and a second rank for the second group based on the first quality and the second quality, wherein the first rank is higher than the second rank; and
selecting a first accentuation that corresponds to the first rank and a second accentuation that corresponds to the second rank, wherein the first accentuation is greater than the second accentuation.

6. The method of claim 1, wherein the accentuation for each selected media asset includes a size, position, video quality, or audio quality associated with each selected media asset.

7. The method of claim 1, further comprising cropping the selected media assets to correspond to a predetermined runtime.

8. The method of claim 1, further comprising:
receiving a user selection of one of the selected media assets while generated for simultaneous consumption; and
in response to the user selection, determining a new accentuation for the one of the selected media assets.

9. The method of claim 1, wherein generating for simultaneous consumption by the user the selected media assets includes presenting the selected media assets in a mosaic display.

10. The method of claim 1, wherein one of the selected media assets is a video presentation, one of the selected media assets is an audio presentation, and one of the selected media assets is a text-based presentation.

11. A system for generating for display customized collages of media content, the system comprising:
storage circuitry configured to store a user criterion; and
control circuitry configured to:
determine a plurality of media assets corresponding to the user criterion;
after determining the plurality of media assets, compare characteristics of a first media asset of the plurality of media assets to characteristics of a second media asset of the plurality of media assets;
in response to determining that the characteristics of the first media asset correspond to the characteristics of the second media asset, categorize the first and the second media assets into a first group of a plurality of groups with similar characteristics;
in response to determining that the characteristics of the first media asset do not correspond to the characteristics of the second media asset, categorize the first media asset into the first group and the second media asset into a second group of a plurality of groups;
select a media asset from each of the groups;
determine an accentuation for each selected media asset based on a quality associated with a group from which the selected media asset was selected; and
generate for simultaneous consumption by a user the selected media assets on a display device with the determined accentuation.

12. The system of claim 11, wherein the control circuitry is further configured to:
receive, via user input interface circuitry, the user criterion; and
cross-reference the user criterion with a database of available media to determine the plurality of media assets corresponding to the user criterion.

13. The system of claim 11, wherein the similar characteristics include similar content, similar content types, or similar content sources, and wherein the quality associated with the group from which the selected media asset was selected includes a number of media assets in each group, a popularity of media assets in each group, or a popularity of sources of media assets in each group.

14. The system of claim 11, wherein the control circuitry is further configured to cross-reference the quality associated with the group from which the selected media asset was selected with a database mapping qualities to accentuations to determine the accentuation for each selected media asset.

15. The system of claim 11, wherein to determine the accentuation for each selected media asset based on the quality associated with the group from which the selected media asset was selected, the control circuitry is further configured to:
determine a first quality associated with the first group;
determine a second quality associated with the second group;
determine a first rank for the first group and a second rank for the second group based on the first quality and the second quality, wherein the first rank is higher than the second rank; and select a first accentuation that corresponds to the first rank and a second accentuation that corresponds to the second rank, wherein the first accentuation is greater than the second accentuation.

16. The system of claim 11, wherein the accentuation for each selected media asset includes a size, position, video quality, or audio quality associated with each selected media asset.

17. The system of claim 11, wherein the control circuitry is further configured to crop the selected media assets to correspond to a predetermined runtime.

18. The system of claim 11, wherein the control circuitry is further configured to:
receive a user selection of one of the selected media assets while generated for simultaneous consumption; and
in response to the user selection, determine a new accentuation for the one of the selected media assets.

19. The system of claim 11, wherein the control circuitry configured to generate for simultaneous consumption by the user the selected media assets is further configured to present the selected media assets in a mosaic display.

20. The system of claim 11, wherein one of the selected media assets is a video presentation, one of the selected media assets is an audio presentation, and one of the selected media assets is a text-based presentation.

* * * * *